US011623740B2

(12) United States Patent
Chu et al.

(10) Patent No.: US 11,623,740 B2
(45) Date of Patent: Apr. 11, 2023

(54) SPLIT-REFERENCE SYSTEM AND METHOD FOR RAPID RE-TRIMMING RATE COMMAND OF FORCE TRIM RELEASE

(71) Applicant: The Boeing Company, Chicago, IL (US)

(72) Inventors: Bryan C. Chu, Phoenix, AZ (US);
Jacob Walrath, San Antonio, TX (US);
Gary D. Klein, Mesa, AZ (US);
Donald J. Hunter, Newberry, FL (US)

(73) Assignee: The Boeing Company, Arlington, VA (US)

( * ) Notice: Subject to any disclaimer, the term of this patent is extended or adjusted under 35 U.S.C. 154(b) by 79 days.

(21) Appl. No.: 17/407,379

(22) Filed: Aug. 20, 2021

(65) Prior Publication Data

US 2022/0266986 A1    Aug. 25, 2022

Related U.S. Application Data

(60) Provisional application No. 63/151,151, filed on Feb. 19, 2021.

(51) Int. Cl.
*B64C 13/00* (2006.01)
*B64C 13/50* (2006.01)
*B64C 13/04* (2006.01)
*B64C 13/08* (2006.01)

(52) U.S. Cl.
CPC ........ *B64C 13/503* (2013.01); *B64C 13/0421* (2018.01); *B64C 13/08* (2013.01)

(58) Field of Classification Search
CPC .............. B64C 13/503; B64C 13/0421; B64C 13/0427; B64C 13/505; B64C 13/507; B64C 13/08; B64C 13/16; B64C 13/30; B64C 27/57; B64C 27/605; B64C 27/68; G05D 1/0077; G05D 1/0858
See application file for complete search history.

(56) References Cited

U.S. PATENT DOCUMENTS

| | | | |
|---|---|---|---|
| 6,679,458 B2 | 1/2004 | Einthoven et al. | |
| 8,025,256 B2 | 9/2011 | Miller et al. | |
| 10,261,517 B2* | 4/2019 | Bothwell | B64C 13/503 |
| 2019/0055004 A1* | 2/2019 | Schaeffer | G05D 1/0858 |

FOREIGN PATENT DOCUMENTS

EP    2490936 B1    6/2015

* cited by examiner

*Primary Examiner* — Ian Jen
(74) *Attorney, Agent, or Firm* — Walters & Wasylyna LLC

(57) ABSTRACT

A flight control system includes an active control inceptor, a flight control computer, and a force trim release. The active control inceptor includes a control member movable from a first position to a second position to command a vehicle-body rate and including a detent position that holds an attitude. The flight control computer generates a trim command from the second position, a reference position, and a vehicle-body state. With the force trim release selected when the control member is moved from the first position to the second position, the first position is designated as the reference position and the second position is designated as the detent position. Upon deselection of the force trim release with the control member at the second position, the second position is designated as the reference position and the trim command is designated as the detent position.

20 Claims, 11 Drawing Sheets

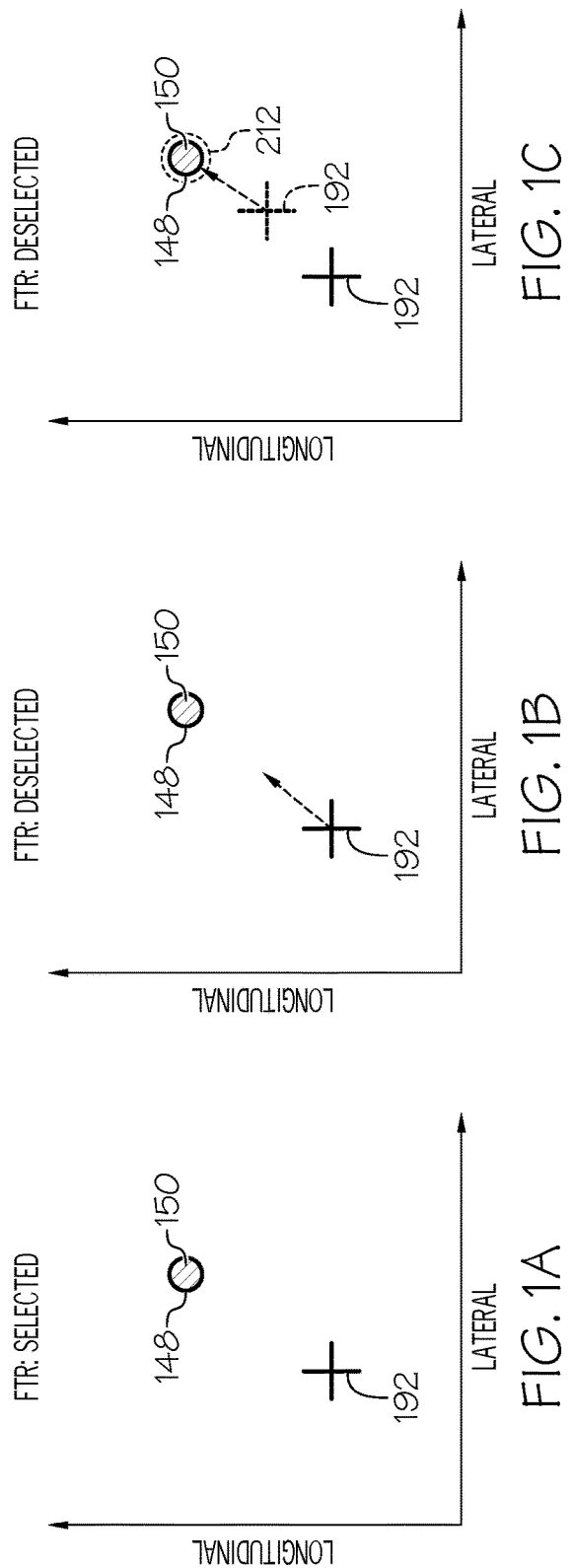

SPLIT-REFERENCE SYSTEM AND METHOD FOR RAPID RE-TRIMMING RATE COMMAND OF FORCE TRIM RELEASE

PRIORITY

This application claims priority from U.S. Ser. No. 63/151,151 filed on Feb. 19, 2021.

FIELD

The present disclosure relates generally to vehicle controls and, more particularly, to split-reference systems and methods for controlling flight of aeronautic vehicles by means of rapid re-trimming rate command operator input.

BACKGROUND

In aeronautic vehicles, such as aircraft and rotorcraft, a pilot uses a control inceptor to control the aeronautic vehicle. In traditional aeronautic vehicles, the pilot must continuously adjust a position of the control inceptor to maintain desired vehicle states, such as velocity, attitude, altitude, and the like. Many modern aeronautic vehicles include an active control inceptor that provides real-time control feel characteristics or tactile feedback to the pilot. Advanced aeronautic vehicles include automated flight control systems for maintaining one or more of the desired vehicle states, referred to as trimming the vehicle. Such systems can include a force trim feature that holds the control inceptor in a trim position that maintains the desired vehicle state and a force trim release that temporarily disengages the force trim to allow the pilot to manually change the vehicle state. However, such systems present challenges when reengaging the force trim with the control inceptor at the new trim position.

Thus, there is a need for a flight control system that addresses these challenges. Accordingly, those skilled in the art continue with research and development efforts in the field of flight controls for aeronautic vehicles.

SUMMARY

Disclosed are examples of a flight control system for an aeronautic vehicle, an aeronautic vehicle, and a method for controlling flight of an aeronautic vehicle. The following is a non-exhaustive list of examples, which may or may not be claimed, of the subject matter according to the present disclosure.

In an example, the disclosed flight control system includes an active control inceptor configured to selectively control a flight control surface of the aeronautic vehicle. The active control inceptor includes a control member configured to be moved to from a first stick position to a second stick position to command a vehicle-body rate of the aeronautic vehicle and including a detent position that holds an attitude of the aeronautic vehicle when an input force, applied to the control member by an operator, is zero. The flight control system also includes a flight control computer coupled to the active control inceptor and programmed to generate a trim command from the second stick position, a reference position, and a vehicle-body state of the aeronautic vehicle. The flight control system further includes a force trim release coupled to the active control inceptor and to the flight control computer. The force trim release is configured to be selected or deselected. With the force trim release selected when the control member is moved from the first stick position to the second stick position by application of the input force by the operator, the flight control computer designates the reference position to be equal to the first stick position and the active control inceptor designates the detent position to be equal to the second stick position. Upon deselection of the force trim release with the control member at the second stick position, the flight control computer designates the reference position to be equal to the second stick position and the active control inceptor designates the detent position to be equal to the trim command.

In an example, the disclosed aeronautic vehicle includes a flight control surface configured to selectively control an attitude of the aeronautic vehicle. The aeronautic vehicle also includes an active control inceptor configured to selectively control the flight control surface. The active control inceptor includes a control member configured to be moved from a first stick position to a second stick position to command a vehicle-body rate of the aeronautic vehicle and includes a detent position that holds the attitude of the aeronautic vehicle when an input force, applied to the control member by an operator, is zero. The aeronautic vehicle further includes a flight control computer coupled to the active control inceptor and programmed to generate a trim command from the second stick position, a reference position, and a vehicle-body state of the aeronautic vehicle. The aeronautic vehicle also includes a force trim release coupled to the active control inceptor and to the flight control computer. The force trim release is configured to be selected or deselected. With the force trim release selected when the control member is moved from the first stick position to the second stick position by application of the input force by the operator, the flight control computer designates the reference position to be equal to the first stick position and the active control inceptor designates the detent position to be equal to the second stick position. Upon deselection of the force trim release with the control member at the second stick position, the flight control computer designates the reference position to be equal to the second stick position and the active control inceptor designates the detent position to be equal to the trim command.

In an example, the method of controlling flight of an aeronautic vehicle includes steps of: (1) operating the aeronautic vehicle in an automated trim mode in which an active control inceptor automatically positions a control member at a detent position to hold an attitude of the aeronautic vehicle when an input force, applied to the control member by an operator, is zero; (2) with the control member at a first stick position, selecting a force trim release to temporarily override the automated trim mode; (3) upon selecting the force trim release, designating a first stick position of the control member as a reference position; (4) with the force trim release selected, moving the control member from the first stick position to a second stick position, by application of the input force by the operator, to command a vehicle-body rate of the aeronautic vehicle; (5) with the force trim release selected and with the control member at the second stick position, designating the second stick position as the detent position; (6) with the control member at the second stick position, deselecting the force trim release to reengage the automated trim mode; and (7) upon deselecting the force trim release, designating the second stick position as the reference position and designating a trim command as the detent position.

Other examples of the disclosed system, aeronautic vehicle, and method will become apparent from the following detailed description, the accompanying drawings, and the appended claims.

BRIEF DESCRIPTION OF THE DRAWINGS

FIGS. 1A-1E, in combination, schematically illustrate an example of an operation of a split reference system utilized by a flight control system for an aeronautic vehicle;

DETAILED DESCRIPTION

Figure 2C:
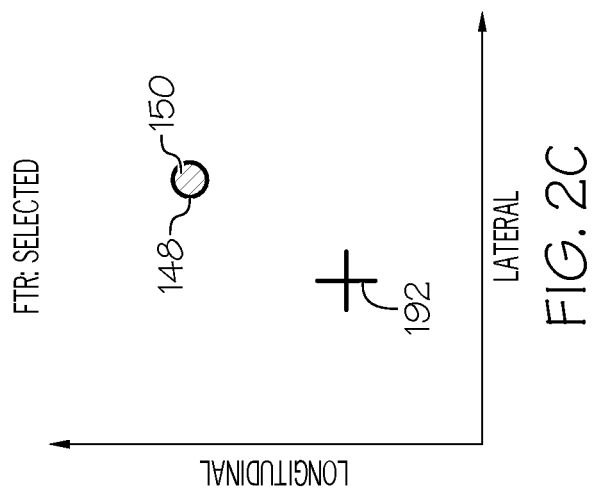
FIGS. 2A-2C schematically illustrate examples of the operation of the flight control system.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring generally to FIGS. 1-9, by way of examples, the present disclosure is related to a flight control system 116 for an aeronautic vehicle 100 and to the aeronautic vehicle 100 using the flight control system 116. Referring generally to FIG. 10, by way of examples, the present disclosure is also related to a method 1000 of controlling flight of the aeronautic vehicle 100 using the flight control system 116.

The present disclosure recognizes that modern aeronautic vehicles, such as aircraft and rotorcraft, have automated flight control systems that implement various modes of operation of the aeronautic vehicle according to control laws executed by a flight control computer. Each mode of operation has a different level of authority over one or more flight controls.

The present disclosure also recognizes that force trim release on a center cyclic stick is a fundamental part of maneuvering flight controls capability for many types of aeronautic vehicles, such as rotorcraft. However, implementing force trim release on an active back-drive equipped flight control system has many complications. For example, when engaging the force trim release on an active back-driven flight control system, there is a question as to what should be done with the flight control laws and what should be done with active inceptor controller algorithms before, during, and after engagement of the force trim release. More fundamentally, when implementing a rate command system with the force trim release engaged (e.g., activated), there is a question as to what reference position corresponds to zero rate and how the active back-drive is disengaged and reengaged between activation and deactivation of the force trim release. Improper implementation of such a rate command system can result in stick jumps or stick oscillations on disengagement and reengagement of the active back-drive.

Figure 4:
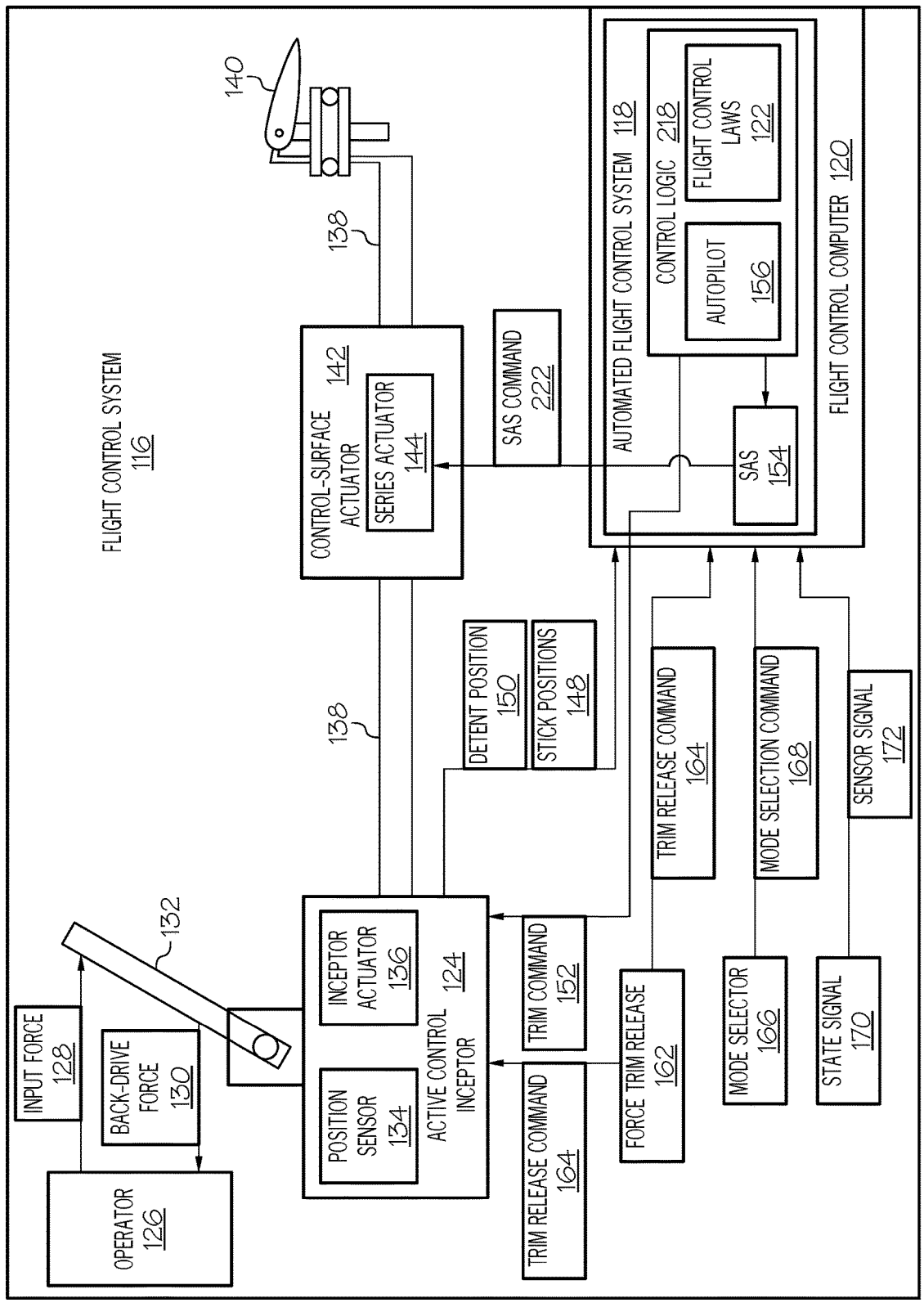
FIG. 4 is a schematic block diagram of an example of the flight control system.

The flight control system 116 and method 1000, described herein, provides a new mode of operation, referred to as a rapid re-trimming rate command (RRRC) mode, for aeronautic vehicles, such as aircraft and rotorcraft, equipped with a back-drive system. The rapid re-trimming rate command mode enables smooth transitions between slow back-drive control laws and rapid repositioning of vehicle trim by use of split reference tracking between the flight control laws and lower-level full authority enabling active inceptor controls. As will be described in more detail herein, the rapid re-trimming rate command mode is activated by selecting the force trim release (e.g., force trim release 162) (FIG. 4). The rapid re-trimming rate command mode provides an operator of the aeronautic vehicle the ability to select the force trim release, override an automated flight control system, and quickly reposition the stick to command the aeronautic vehicle.

In one or more examples, the flight control system 116 and method 1000 enables the rapid re-trimming rate command mode to be engaged when the force trim release selected while the back-drive is active by: locking a control law detent position as a zero-rate reference; allowing a pilot to command a rate from the locked detent position; having a trim detent for an active inceptor split follow an actual stick position; and allowing for smooth return to regular back-drive operation and recombination of the split references after the force trim release is deselected. The rapid re-trimming rate command mode provides the pilot the ability to rapidly re-trim the aeronautic vehicle when needed in a manner that is significantly faster than an automatic trimming (e.g., back-driving) system.

Generally, the flight control system 116 and the method 1000 splits a reference position used in control law code and a detent used in active inceptor software algorithms. The detent in the active inceptor tracks the stick while the reference position of the control law code stays fixed at the stick position where force trim release selection occurred. A benefit of using this strategy is that the control law reference position can be locked in place from initial selection of the force trim release, thus allowing for rates to be commanded by the pilot moving the stick from the fixed position. Upon deselection of the force trim release, the commanded detent position from the active inceptor stays with the stick, thus preventing any sort of stick jump or stick oscillation. However, at the same time, the commanded reference position from the flight control laws resynchronizes with the stick position. Once the commanded reference position from the flight control laws and the detent held by the active inceptor are within a certain threshold, the active inceptor detent switches from the current stick position to the reference position, provided from the active back-drive command output according to the control laws, and higher augmented autopilot features are reenabled.

The flight control system 116 and the method 1000 take advantage of higher order modes of operation and automation functions provided by an active back-drive advanced flight control system, while providing the pilot the ability to seamlessly switch back and forth between a native rate command mode, which is predictable and familiar to a legacy pilot. Moreover, for a next generation pilot, the flight control system 116 and the method 1000 provide the ability to switch between a fully augmented system with autopilot and/or other advanced features and a lower-level system that resembles how the aeronautic vehicle would respond if the back-drive system were to fail or the system entered Back-Up Control System (BUGS) mode for emergency training purposes.

Referring now to FIGS. 1A-1E, 2A-2C and 3A-3C, which illustrate example implementations of the flight control system 116 (FIG. 4) and the method 1000 (FIG. 10). Generally, the flight control system 116 and the method 1000 utilize a split reference system to marry a force trim release rate command mode with an active back-drive control system that has higher augmented modes. The split in the reference commands between flight control laws 122 (FIG. 4) and lower-level software of an active control inceptor 124 (FIG. 4) facilitates establishing a rate command zero reference, eliminating stick jump upon deselection of a force trim release (FTR) 162 (FIG. 4), and recombining the detent and the reference.

In one or more examples, implementations of the flight control system 116 and the method 1000 enable splitting of a detent position 150 (e.g., a physical detent) and a reference position 192 upon selecting the force trim release 162 (FIG. 4) and recombining the detent position 150 and the reference position 192 upon deselecting the force trim release 162. The flight control system 116 and the method 1000 enable a zero-rate reference to be established such that a rate command can be commanded by displacing a control member 132 (e.g., a stick) of the aeronautic vehicle 100 (FIG. 5) when the force trim release 162 is initially selected and such that the reference position 192 and the detent position 150 can be recombined smoothly when the force trim release 162 is deselected. The detent position 150, the reference position 192, and a stick position 148 (e.g., a position of the control member 132) represent three distinct positions in a longitudinal-lateral plane that are tracked.

Figure 2B:
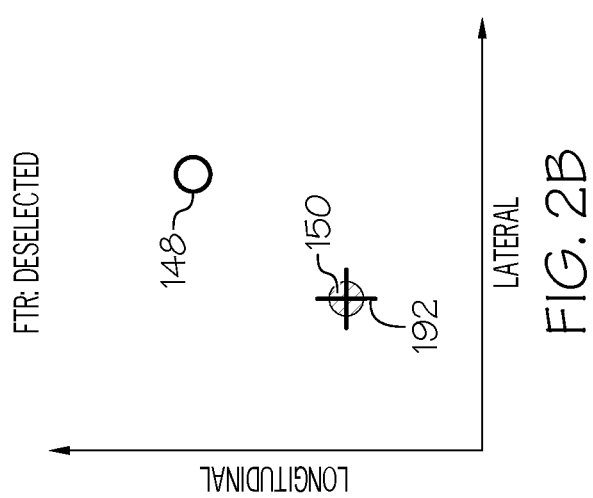
Figure 2A:
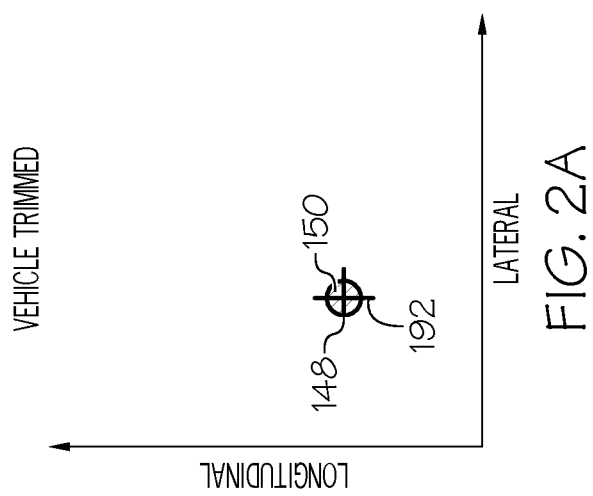

FIGS. 2A-2C illustrate examples of the detent position 150, the reference position 192, and the stick position 148 in various operating scenarios.

FIG. 2A illustrates the aeronautic vehicle 100 trimmed and operating in an automatic trimming mode in which an automated flight control system 118 (FIG. 4) has authority over one or more flight states of the aeronautic vehicle 100. In this scenario, the detent position 150, the reference position 192, and the stick position are co-located at the same position. For example, the detent position 150, the reference position 192, and the stick position are locked together.

FIG. 2B illustrates a change in the stick position 148 with the force trim release 162 (FIG. 4) deselected. With the force trim release 162 deselected, an operator 126 (e.g., pilot) applies an input force 128 (FIG. 4) to move (e.g., displace) the control member 132 and, thus, to change the stick position 148 from a first stick position (as illustrated in FIG. 2A) to a second stick position (as illustrated in FIG. 2B). In this scenario, the detent position 150 and the reference position 192 are the same. For example, the detent position 150 and the reference position 192 are locked together.

FIG. 2C illustrates a change in the stick position 148 with the force trim release 162 selected. With the force trim release 162 selected, the operator 126 selects the force trim release 162 applies the input force 128 to move (e.g., displace) the control member 132 and, thus, to change the stick position 148 from the first stick position (as illustrated in FIG. 2A) to the second stick position (as illustrated in FIG. 2C). In this scenario, the detent position 150 and the stick position 148 are the same. For example, the detent position 150 follows the stick position 148.

Figure 3C:
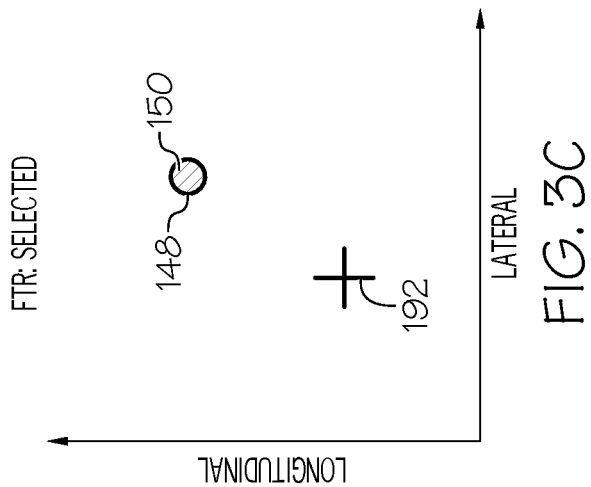
FIGS. 3A-3C schematically illustrate examples of the operation of the flight control system within the context of automated trim adjustments.
Figure 3B:
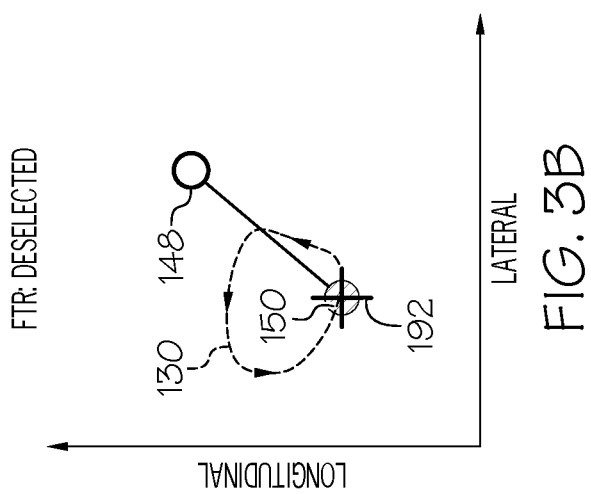
Figure 3A:
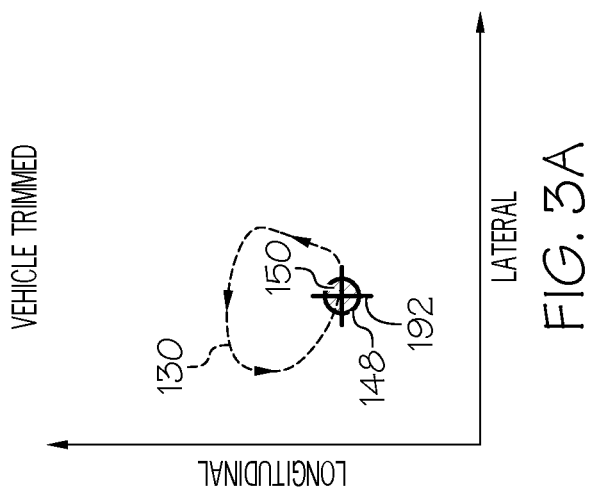

FIGS. 3A-3C illustrate examples of the detent position 150, the reference position 192, and the stick position 148 in the operating scenarios of FIGS. 2A-2C with an automatic back-drive engaged.

FIG. 3A illustrates the aeronautic vehicle 100 trimmed and operating in the automatic trimming mode. In this scenario, the detent position 150, the reference position 192, and the stick position 148 are co-located at the same position. For example, the detent position 150, the reference position 192, and the stick position 148 are locked together. The operator 126 is applying no force to the control member 132 (e.g., the input force 128 is zero). A back-drive force 130 is applied to the control member 132 by an inceptor actuator 136 of an active control inceptor 124 (FIG. 4). Application of the back-drive force 130 is based on selection or deselection of the force trim release 162. The back-drive force 130 moves the control member 132 in response to external forces and moments applied to the aeronautic vehicle 100 to maintain the state of the aeronautic vehicle 100. Thus, movement of the control member 132 by the back-drive force 130 concurrently moves the stick position 148, the detent position 150, and the reference position 192.

FIG. 3B illustrates a change in the stick position 148 with the force trim release 162 (FIG. 4) deselected. With the force trim release 162 deselected, the operator 126 applies the input force 128 that exceeds the back-drive force 130 to move (e.g., displace) the control member 132 and, thus, to change the stick position 148 from the first stick position (as illustrated in FIG. 3A) to the second stick position (as illustrated in FIG. 3B). In this scenario, the detent position 150 and the reference position 192 are the same. For example, the detent position 150 and the reference position 192 are locked together. The back-drive force 130 concurrently moves the detent position 150 and the reference position 192. The back-drive force 130 also urges the control member 132 and, thus, the stick position 148 toward the detent position 150.

FIG. 3C illustrates a change in the stick position 148 with the force trim release 162 selected. With the force trim release 162 selected, the operator 126 applies the input force 128 to move (e.g., displace) the control member 132 and, thus, to change the stick position 148 from the first stick position (as illustrated in FIG. 3A) to the second stick position (as illustrated in FIG. 3C). In this scenario, the detent position 150 and the stick position 148 are the same. For example, the detent position 150 follows the stick position 148. In this scenario, there is no back-drive force 130 applied to the control member 132.

FIGS. 1A-1E, in combination, illustrate an example of splitting and rejoining the detent position 150 and the reference position 192 in a split reference system.

FIG. 1A illustrates a change in the stick position 148 with the force trim release 162 selected, such as described above and illustrated in FIG. 3C. With the force trim release 162 selected, the operator 126 applies the input force 128 to move (e.g., displace) the control member 132 and, thus, to change the stick position 148. In this scenario, the detent position 150 and the stick position 148 are the same. For example, the detent position 150 follows to the stick position 148. In this scenario, the reference position 192 is locked.

FIG. 1B illustrates the stick position 148, the detent position 150, and the reference position 192 when the force trim release 162 is deselected after changing of the stick position 148 (e.g., moving the control member 132) and the detent position 150. In this scenario, the detent position 150 remains at the stick position 148. The reference position 192 is set to the stick position 148 (e.g., as illustrated by the arrow).

Because the detent position 150 and the reference position 192 are split at this point in the operation, the detent position 150 and the reference position 192 must be resynchronized for the back-drive (e.g., the inceptor actuator 136) to be reengaged. Care must be taken so that the synchronization does not cause a violent or unpredictable jump and/or oscillation of the control member 132. Splitting the reference position 192 and the detent position 150 is advantageous because stick jump during resynchronization is eliminated since the detent position 150 (e.g., active inceptor reference) is at the stick position 148. At this point, the reference position 192 catches up with the stick position 148 to resynchronize with the detent position 150.

FIG. 1C illustrate resynchronizing the reference position 192 and the detent position 150. FIG. 1D illustrates merging of the reference position 192 with the detent position 150 before back-driving can recommence. In this scenario, the detent position 150 remains at the stick position 148. The reference position 192 moves to the stick position 148 (e.g., as shown in FIG. 1C) and merges with the detent position 150 at the stick position 148 (e.g., as shown in FIG. 1D).

In one or more examples, a predefined threshold 212 (FIGS. 1C and 1D) is used during resynchronization. For example, the detent position 150 is maintained at the stick position 148 until the reference position 192 is within the predefined threshold 212. As an example, the predefined threshold 212 is approximately 0.10 inch (2.5 mm) to prevent a jump or oscillation of the control member 132 upon merge of the reference position 192 and the detent position 150 and reengagement of the back-drive.

FIG. 1E illustrates the aeronautic vehicle 100 trimmed and operating in the automatic trimming mode at the new (e.g., second) stick position 148. In this scenario, the detent position 150, the reference position 192, and the stick position 148 are co-located at the same position. For example, the detent position 150, the reference position 192, and the stick position 148 are locked together. The operator 126 is applying no force to the control member 132 (e.g., the input force 128 is zero). The inceptor actuator 136 (e.g., the back-drive) of the active control inceptor 124 reengages and the back-drive force 130 resumes application to the control member 132. The back-drive force 130 moves the control member 132 in response to external forces and moments applied to the aeronautic vehicle 100 to maintain the state of the aeronautic vehicle 100. Thus, movement of the control member 132 by the back-drive force 130 concurrently moves the stick position 148, the detent position 150, and the reference position 192.

Figure 5:
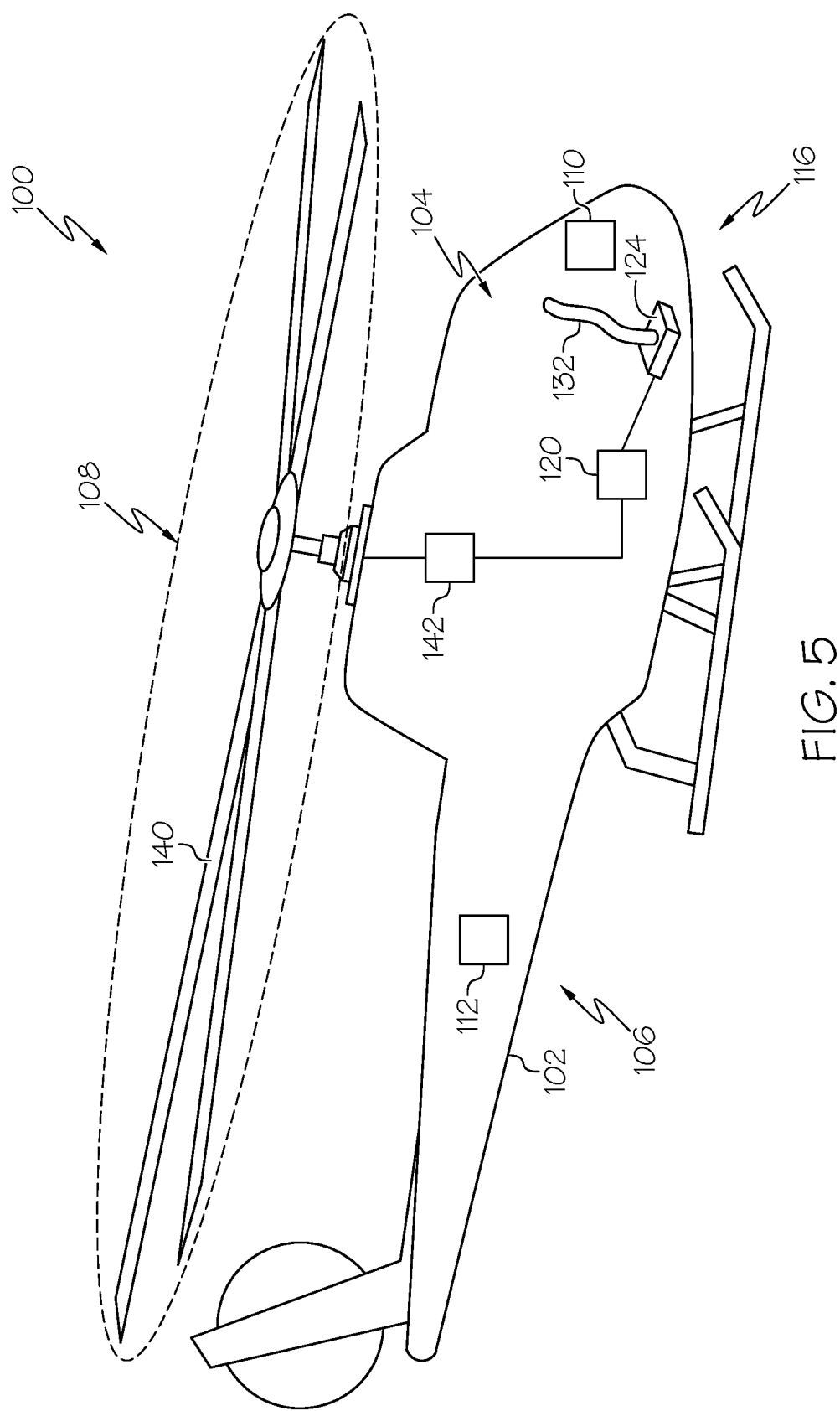
FIG. 5 is a schematic illustration of an example of the aeronautic vehicle.

Referring now to FIG. 5, which schematically illustrates an example of the aeronautic vehicle 100. In one or more examples, the aeronautic vehicle 100 is a rotorcraft, such as a helicopter (e.g., as illustrated in FIG. 5). In one or more examples, the aeronautic vehicle 100 is an aircraft, such as a fixed wing aircraft, a vertical take-off and landing (VTOL) aircraft, and the like. In one or more examples, the aeronautic vehicle 100 is a spacecraft. In other examples, the aeronautic vehicle 100 is another type of flying vehicle.

In one or more examples, the aeronautic vehicle 100 includes an airframe 102, having an interior 104, and a plurality of high-level systems 106. Examples of the high-level systems 106 include one or more of a propulsion system 108 (e.g., a rotor as shown in FIG. 5), an electrical system 110, a hydraulic system 112, and a flight control system 116. In other examples, the aeronautic vehicle 100 may include any number of other types of systems, such as a communications system, a guidance system, a weapons system, an environmental system, and the like.

In one or more examples, the aeronautic vehicle 100 includes a flight control surface 140. The aeronautic vehicle 100 can include any number of flight control surfaces 140. The flight control surface 140 is configured to selectively control an attitude of the aeronautic vehicle 100. In one or more examples, the flight control surface 140 includes, or takes the form of, rotor blades of a rotorcraft.

Referring now to FIG. 4, which schematically illustrates an example of the flight control system 116. The flight control system 116 includes the active control inceptor 124, a flight control computer 120, and the force trim release 162.

The active control inceptor 124 is configured to selectively control the flight control surface 140 (e.g., the rotor blades) of the aeronautic vehicle 100 (e.g., helicopter). In one or more examples, the active control inceptor 124 includes the control member 132, also referred to as a stick. In one or more examples, the active control inceptor 124 is configured to provide the detent position 150 to the flight control computer 120. In one or more examples, the active control inceptor 124 is configured to provide the stick position 148 of control member 132 to the flight control computer 120.

The control member 132 includes a plurality of stick positions 148. In other words, the control member 132 is configured to be moved (e.g., is movable) to any one of the stick positions 148 to command a vehicle-body rate of the aeronautic vehicle 100. Movement of the control member 132 between two of the stick positions 148 translates to selective control of the flight control surface 140 of the aeronautic vehicle 100.

For example, to command (e.g., affect a change in) the vehicle-body rate of the aeronautic vehicle 100, the control member 132 is moved from a first stick position 148-1 to a second stick position 148-2. The vehicle-body rate refers to the body-axis rate of the aeronautic vehicle 100. The vehicle-body rate represents the rate of rotation of the aeronautic vehicle 100 about the body axes that are fixed to the rotating and translating vehicle body (e.g., longitudinal axis, lateral axis and vertical axis of the aeronautic vehicle).

The control member 132 also includes the detent position 150 that holds an attitude of the aeronautic vehicle 100 when an input force 128, applied to the control member 132 by an operator 126, is zero. The detent position 150 is a zero-force position of the control member 132. The detent position 150 is determined based on detent logic 186 (FIGS. 7 and 9) of the flight control system 116. The detent position 150 is a position (e.g., one of a plurality of stick positions 148) of the control member 132 where the control member 132 will rest without operator input (i.e., the input force 128, applied to the control member 132 by an operator 126, is zero). For example, the detent position 150 is the position of the control member 132 that the control laws 122 generate (e.g., compute and output) as a trim command 152 when the force trim release 162 is not selected (e.g., as illustrated in FIGS. 1E, 2A, 2B, 3A and 3B) or when the force trim release 162 has been recently deselected (e.g., as illustrated in FIGS. 1B-1D).

In one or more examples, the active control inceptor 124 includes a position sensor 134. The position sensor 134 is configured to determine the position of the control member 132 and, thus, generate a position signal representative of the stick position 148.

In one or more examples, the active control inceptor 124 includes an inceptor actuator 136. The inceptor actuator 136 is coupled to the control member 132. The inceptor actuator 136 is configured to generate and selectively apply the back-drive force 130 to the control member 132. In one or more examples, the inceptor actuator 136 is a motor, a mechanical device, a hydraulic device, a pneumatic device, or other actuation device.

In one or more examples, with the force trim release 162 selected, the inceptor actuator 136 is configured to not apply the back-drive force 130 to the control member 132. With the force trim release 162 deselected and the input force 128, applied to the control member 132 by the operator 126, being zero, the inceptor actuator 136 is configured to apply the back-drive force 130 to the control member 132 to automatically move the control member 132 to the detent position 150.

Figure 7:
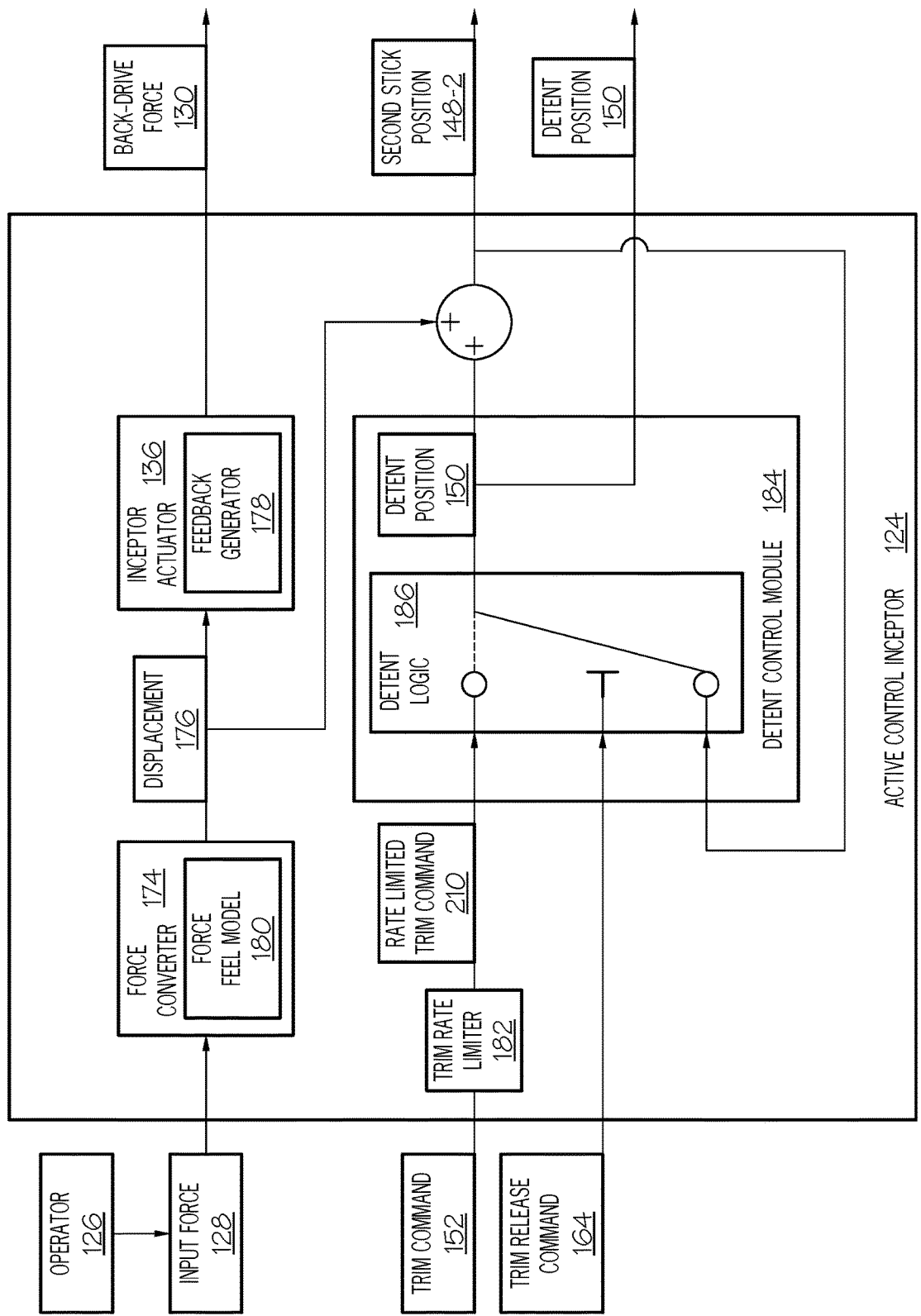
FIG. 7 is a schematic block diagram of an example of an active control inceptor of the flight control system.

Referring briefly to FIG. 7, in one or more examples, the active control inceptor 124 includes a force converter 174. The force converter 174 is configured to receive the input force 128, applied by the operator 126, and to generate a displacement 176. The displacement 176 that is generated is dependent upon a force feel model 180 that specifies a displacement as a function of the force applied. In one or more examples, the inceptor actuator 136 includes a feedback generator 178. The feedback generator 178 is configured to resist the input force 128, provided by the operator 126.

Referring again to FIG. 4, the flight control computer 120 is coupled to and is in communication with the active control inceptor 124. The flight control computer 120 executes various control laws 122 to implement various modes of operation of the aeronautic vehicle 100. In one or more examples, the flight control computer 120 is programmed (e.g., configured) to generate the trim command 152 and to provide the trim command 152 to the active control inceptor 124.

Figure 6:
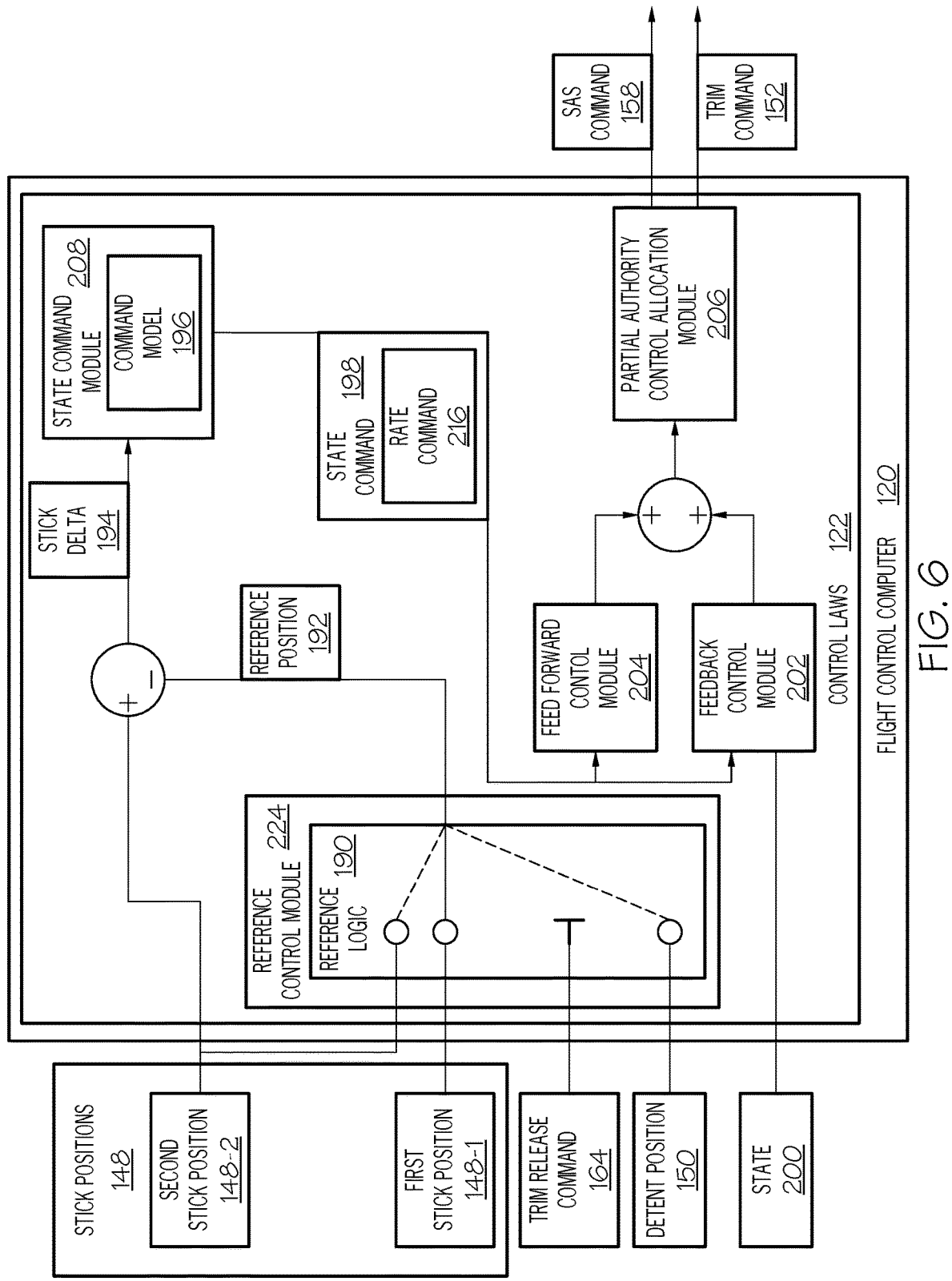
FIG. 6 is a schematic block diagram of an example of a flight control computer of the flight control system.

The trim command 152 is computed by the flight control computer 120 when the force trim release 162 is deselected. The trim command 152 is generated from (e.g., is computed using) the second stick position 148-2, the reference position 192, and a vehicle-body state 200 (e.g., as shown in FIG. 6) of the aeronautic vehicle 100. The trim command 152 assigns a position of the control member 132 that maintains the aeronautic vehicle 100 in a steady vehicle-body state 200, also referred to as a trimmed state.

The reference position 192 is a control law reference position determined by reference logic 190 (FIGS. 6 and 8) of the flight control system 116. The reference position 192 is used to determine the extent (e.g., magnitude and direction) of the rate command based on displacement of the control member 132 (e.g., the change in stick position 148).

The vehicle-body state 200 represents a trim condition of the aeronautic vehicle 100 when the sum of external forces and moments acting on the aeronautic vehicle 100 is zero. The vehicle-body state 200 is also referred to as the trim-state of the aeronautic vehicle 100. The vehicle-body state 200 is typically defined as a 9-state vector. Typical states include body axial velocities (e.g., along the X-, Y-, and Z-body axes), body angular rates (e.g., about the X-, Y-, and Z-body axes), and body angular attitudes.

In one or more examples, the flight control system 116 includes a state sensor 170. The state sensor 170 is coupled to and is in communication with the flight control computer 120. The state sensor 170 is configured to generate a sensor signal 172 representing the vehicle-body state 200. The state sensor 170 is configured to provide the sensor signal 172 to the flight control computer 120. In one or more examples, the flight control system 116 includes any number of and/or different types of suitable state sensors 170.

In one or more examples, the flight control computer 120 includes the automated flight control system 118. In one or more examples, the automated flight control system 118 includes, or is at least partially implemented by, at least one of a stability augmentation system (SAS) 154, an autopilot system 156, a flight director system, control logic 218 that implements the plurality of flight control laws 122, and the like. The automated flight control system 118 has various modes of operation, for example, as defined by the flight control laws 122. Each one of the modes of operation has authority over one or more flight states of the aeronautic vehicle 100 and each one has a different level of authority over one of more flight states of the aeronautic vehicle 100. Generally, the automated flight control system 118 provides a flight critical portion of the flight control system 116. In one or more examples, the automated flight control system 118 also provides stability and control augmentation, additional mission-critical control laws and additional aiding control laws to enhance the handling qualities of the aeronautic vehicle 100, and mission facilitating control laws.

In one or more examples, the different modes of operation of the automated flight control system 118 are implemented in separate software partitions or different processors of the flight control computer 120 of the flight control system 116. In one or more examples, the automated flight control system 118 includes separate flight control law models (e.g., executed by separate flight control modules) for controlling attitude (e.g., yaw, pitch, and roll), velocity, and altitude (e.g., lift) of the aeronautic vehicle 100.

The force trim release 162 is coupled to and is in communication with the active control inceptor 124 and the flight control computer 120. The force trim release 162 is configured to be selected or deselected. Selecting and deselecting the force trim release 162 changes the mode of operation of the aeronautic vehicle 100. In one or more examples, selecting the force trim release 162 provides a trim release command 164 to the active control inceptor 124 and/or to the flight control computer 120. The trim release command 164 directs the active control inceptor 124 and the flight control computer 120 to change the mode of operation to a different force-feel and control law strategy. For example, selecting the force trim release 162 disengages the automatic trimming mode of operation of the aeronautic vehicle 100 and engages a rate command mode of operation to enable operator-controlled (e.g., manual) command of the vehicle-body rate of the aeronautic vehicle 100 and trim of the aeronautic vehicle 100. Deselecting the force trim release 162 reengages the automatic trimming mode.

In one or more examples, the force trim release 162 includes, or takes the form of, a push button switch or toggle switch that is capable of being engaged or disengaged by the operator 126 to select or deselect the force trim release 162. In one or more examples, the force trim release 162 is configured to be normally deselected. In one or more examples, the force trim release 162 includes, or takes the form of, a momentary switch that is biased in an open position such that the force trim release 162 is normally deselected. In one or more examples, the force trim release 162 (e.g., the switch) is mounted on the control member 132 such that the operator 126 can easily select or deselect the force trim release 162 while handling the control member 132.

In one or more examples, the flight control system 116 includes a mode selector 166. The mode selector 166 is configured to provide a mode selection command 168 to the flight control computer 120. The flight control computer 120 implements a selected mode of operation based on the mode selection command 168 (e.g., the selected mode) and the flight control laws 122. In one or more examples, the mode selector 166 is implemented at least in part by the force trim release 162. For example, mode selection command 168 may be part of the trim release command 164. Other implementations of the mode selector 166 are also contemplated.

The flight control system 116 includes a control-surface actuator 142. The control-surface actuator 142 is coupled to the flight control surface 140. Input to the control-surface actuator 142 is transmitted to the flight control surface 140 via a linkage 138. In one or more examples, the control-surface actuator 142 is coupled to the active control inceptor 124 via the linkage 138. In one or more examples, input to the control-surface actuator 142 is provided by the active control inceptor 124, such as by moving the control member 132. In one or more examples, the control-surface actuator 142 is coupled to the SAS 154. In one or more examples, input to the control-surface actuator 142 is provided by a SAS command 222 that is transmitted by the SAS 154. In one or more examples, the control-surface actuator 142 includes a series actuator 144 (e.g., a series servo-actuator).

Figure 8:
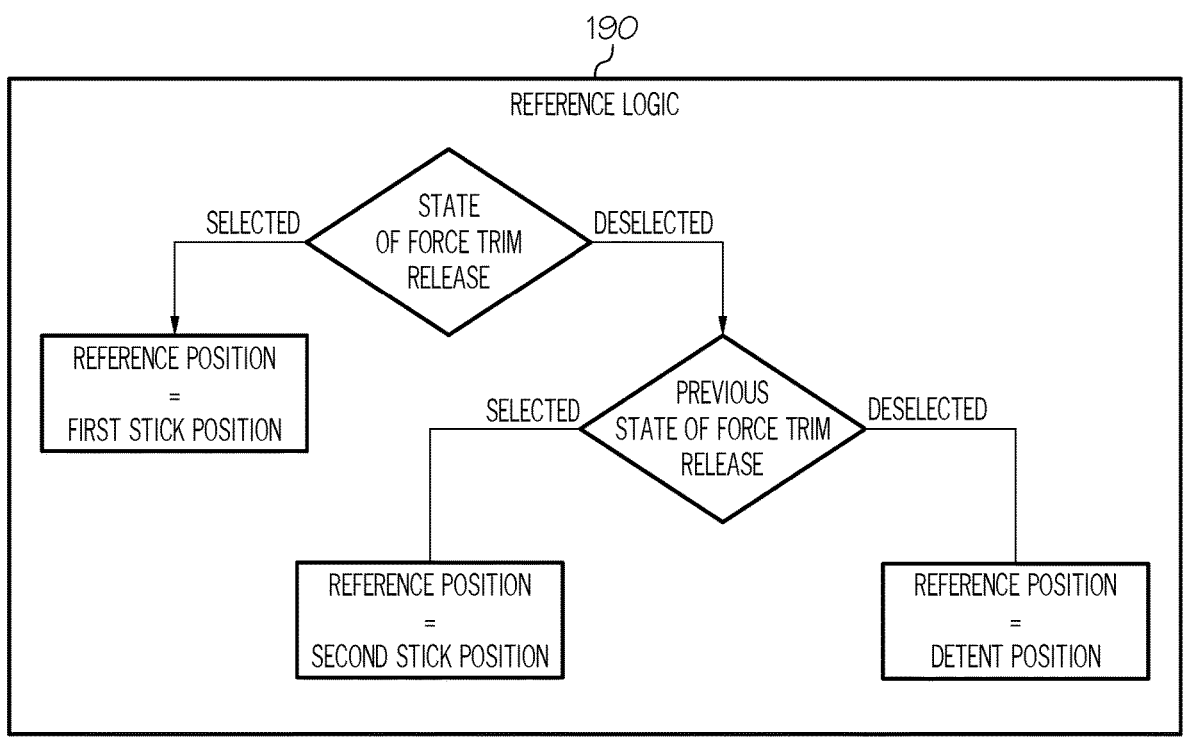
FIG. 8 is a schematic illustration of an example of reference logic executed by the flight control computer.

Referring now to FIG. 6, which schematically illustrates an example implementation of control laws 122 of the flight control computer 120 and FIG. 8, which schematically illustrates an example implementation of reference logic 190 of a reference control module 224 (FIG. 6) of the flight control computer 120. In one or more examples, with the force trim release 162 selected when the control member 132 is moved from the first stick position 148-1 to the second stick position 148-2 by application of the input force 128 by the operator 126, the flight control computer 120 designates the reference position 192 to be equal to the first stick position 148-1 and the active control inceptor 124 designates the detent position 150 to be equal to the second stick position 148-2. Upon deselection of the force trim release 162 with the control member 132 at the second stick position 148-2, the flight control computer 120 designates the reference position 192 to be equal to the second stick position 148-2 and the active control inceptor 124 designates the detent position 150 to be equal to the trim command 152.

In one or more examples, with the force trim release 162 selected, the flight control computer 120 is programmed to determine a stick delta 194 between the reference position 192 and the second stick position 148-2 and generate a rate command 216 from the stick delta 194. The trim command 152 is generated from the rate command 216 and the vehicle-body state 200.

The rate command 216 is a lower-level flight control mode for the aeronautic vehicle 100 (e.g., provides the least augmentation). In rate command, displacement of the control member 132 and, thus, the stick position 148 from the detent position 150 and the reference position 192 is proportional to commanded vehicle-body rate. The mode augmentation a level above Rate Command (RC) is often referred to as Rate Command Attitude Hold (RCAH). The primary difference between RC and RCAH is that upon releasing the control member 132 back to the detent position 150, the attitude that the aeronautic vehicle 100 was at is held for RCAH. Whereas, for RC there is zero rate commanded but no holding of an attitude even when the control member 132 is returned to the reference position 192. Motion of the control member 132 from the detent position 150 is converted purely into rate command.

In one or more examples, the disclosed flight control system 116 and method 1000 enable rapid switching between higher augmented flight modes, such as Rate Command Attitude Hold or Attitude Command Velocity Hold (ACVH), to Rate Command (RC) mode with minimal interruption.

In one or more examples, the flight control computer 120 includes a state command module 208. The state command module 208 is configured to generate a state command 198 based on the stick delta 194 using a command model 196. In one or more examples, the rate command 216 is a sub-command of the state command 198.

In one or more examples, the flight control computer 120 includes additional operational elements, components, and/or modules forming the control law architecture used to implement the control laws 122, as described herein. As examples, the flight control computer 120 includes a feed-forward command module 204, a feedback control module 202, and a partial authority control allocation module 206 that operate to receive the vehicle-body state 200, the state command 198, and the rate command 216 and to generate a SAS command 158 and the trim command 152 according to the control laws 122. Generally, the various modules of the flight control computer 120 receive operator inputs and convert those inputs into smooth vehicle-body state transitions and trim conditions.

Figure 9:
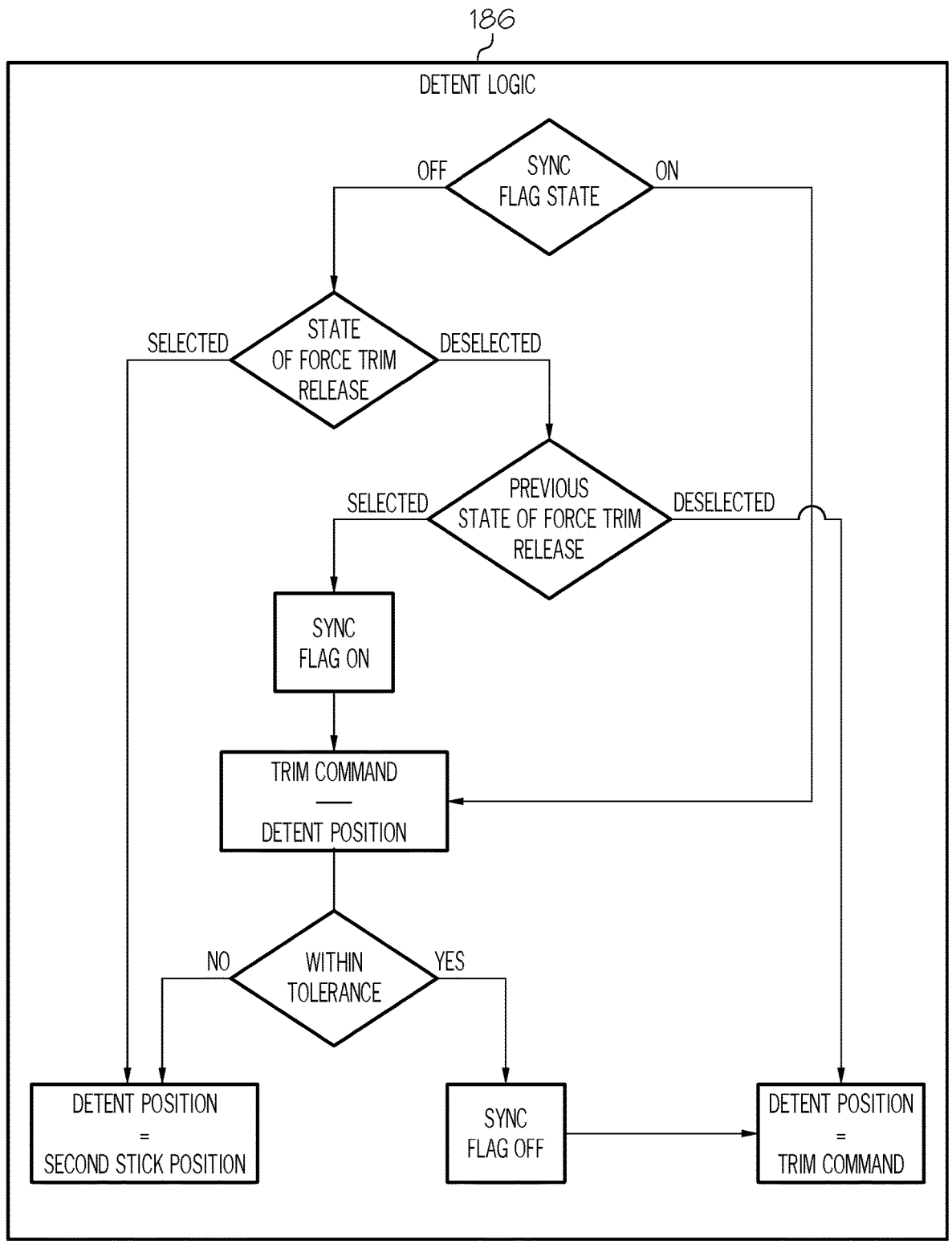
FIG. 9 is a schematic illustration of an example of detent logic executed by the active control inceptor.
Figure 10:
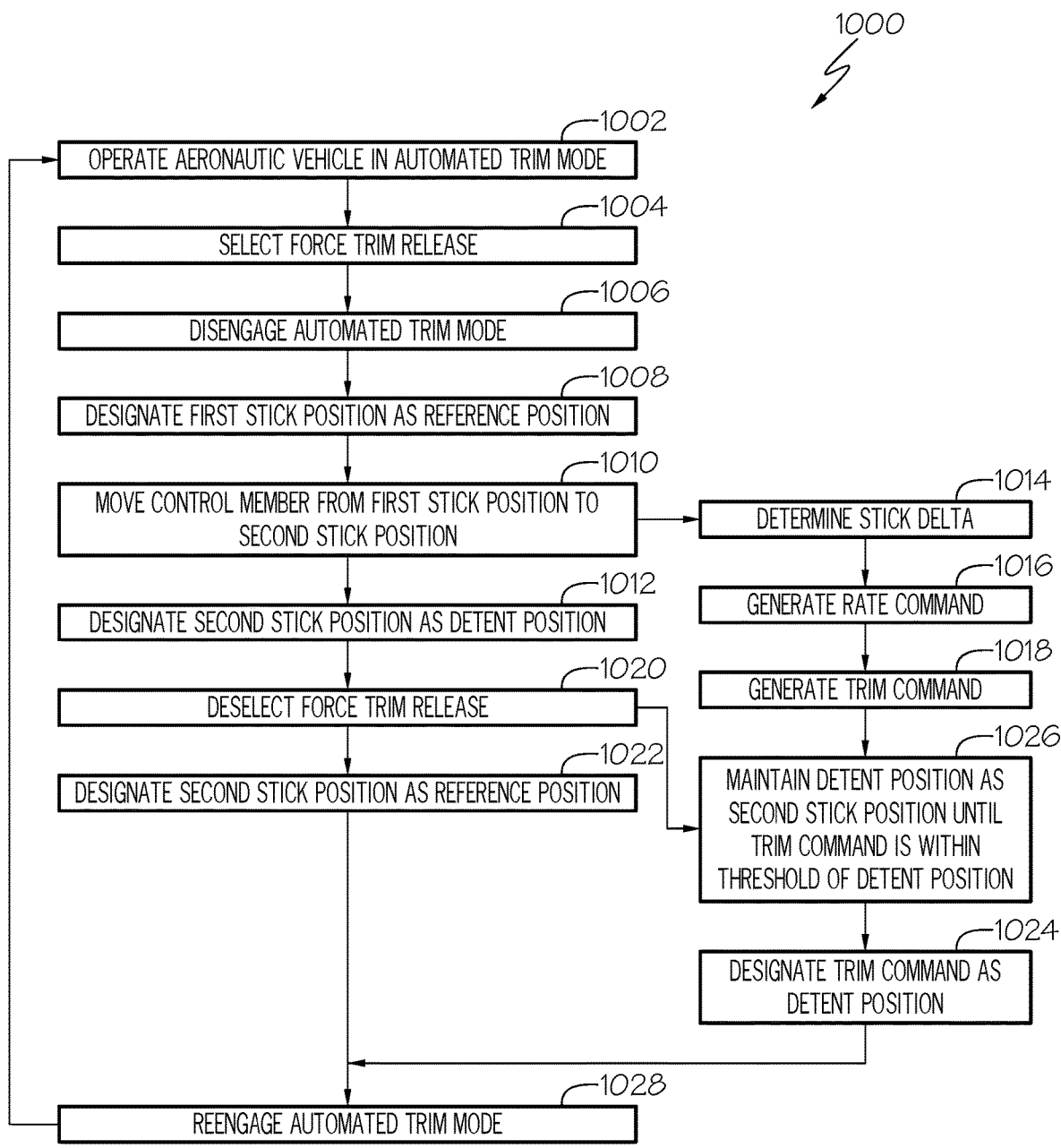
FIG. 10 is a flow diagram of an example of a method of controlling flight of the aeronautic vehicle using the flight control system.

Referring now to FIG. 7, which schematically illustrates an example of the active control inceptor 124 and FIG. 9, which schematically illustrates an example implementation of detent logic 186 of a detent control module 184 (FIG. 7) of the active control inceptor 124. In one or more examples, upon deselection of the force trim release 162, the active control inceptor 124 designates the detent position 150 to be equal to the second stick position 148-2 until the trim command 152 is within a specified tolerance (e.g., as shown in FIG. 9), such as the predefined threshold 212 (e.g., as shown in FIGS. 1C and 1D) of the detent position 150, whereupon the active control inceptor 124 designates the detent position 150 to be equal to the trim command 152.

As illustrated in FIG. 9, a sync flag state (e.g., sync flag on and sync flag off) is used to determine which path of the detent logic 186 is executed. The sync flag is binary. In other words, the sync flag state is either on or off. The sync flag can be turned on and off only by following the appropriate logic path, illustrated in FIG. 9. The sync flag is used to determine when it is appropriate to evaluate the merge and force the merge of the detent position 150 and the trim command 152 for reengagement of back-drive force 130.

Additionally, in FIG. 9, the block indicating "trim command—detent position" represents a mathematical subtraction operation. The difference is taken in the longitudinal-lateral plane because the positions have an X-coordinate and a Y-coordinate (e.g., lateral and longitudinal stick positions). For example, the difference is the distance between two points in a 2-D plane where the two points are the trim command XY-position (e.g., lateral and longitudinal positions) and the detent XY-position (e.g., lateral and longitudinal position).

In one or more examples, the predefined threshold 212 is a radial distance (e.g., no directional dependence) that the trim command 152 and the detent position 150 must be within for merge to occur. In one or more examples, threshold logic calculates the distance between the trim command 152 and the detent position 150 (e.g., the distance between two points in the longitudinal-lateral plane where the x-coordinate is the lateral stick position and the y-coordinate is the longitudinal position). When the distance is less than the predetermined threshold 212, the merge is triggered. Merge refers to the combination of the detent position 150 and the reference position 192, as illustrated in FIGS. 1A-1E. FIGS. 2A and 3A illustrate the operational behavior after the merge, when detent position 150 and the reference position 192 are resynchronized and the back-drive force 130 is active.

Referring again to FIG. 7, in one or more examples, the flight control system 116, such as the active control inceptor 124, includes a trim rate limiter 182. The trim rate limiter 182 is configured to generate a rate limited trim command 210 based on the trim command 152.

In one or more examples, the trim rate limiter 182 acts on the trim command 152. For examples, when a time rate of change of the trim command 152 is too great, it is limited to a predetermined value that the trim rate limiter 182 is set at. An output of the trim rate limiter 182 is the rate limited trim command 210. For example, if the trim command 152 is changing at 3.0 in/second but the trim rate limiter 182 is set at +/−1.0 in/second, the output of the trim rate limiter 182 (e.g., the rate limited trim command 210) will only be +1.0 in/second.

In one or more examples, upon deselection of the force trim release 162, the active control inceptor 124 designates the detent position 150 to be equal to the rate limited trim command 210. In one or more examples, upon deselection of the force trim release 162, the active control inceptor 124 designates the detent position 150 to be equal to the second stick position 148-2 until the rate limited trim command 210 is within the specified tolerance, such as the predefined threshold 212 of the detent position 150, whereupon the active control inceptor 124 designates the detent position 150 to be equal to the rate limited trim command 210.

Referring again to FIGS. 6 and 8, in one or more examples, with the force trim release 162 deselected when the control member 132 is moved from the first stick position 148-1 to the second stick position 148-2, the flight control computer 120 designates the reference position 192 to be equal to the detent position 150 when conditions of merge have been satisfied. In one or more examples, the conditions for merge are based on the trim command 152 and the detent position 150 being within the predetermined threshold 212, as illustrated in FIG. 1A-1E.

Referring now to FIG. 10, which illustrates an example of the method 1000 for controlling flight of the aeronautic vehicle 100 using the flight control system 116.

In one or more examples, the method 1000 includes a step of (block 1002) operating the aeronautic vehicle 100 in an automated trim mode. The automated trim mode refers to a mode of operation (e.g., according to the flight control laws 122) in which the active control inceptor 124 automatically positions the control member 132 at the detent position 150 to hold the attitude of the aeronautic vehicle 100 when the input force 128, applied to the control member 132 by the operator 126, is zero. For example, in the automated trim mode, the automated flight control system 118 (FIG. 1) is active (e.g., engaged) and the operator 126 controls the aeronautic vehicle 100 and the active control inceptor 124 in an automatic, continuous trimming mode.

In one or more examples, with the control member 132 at the first stick position 148-1, the method 1000 includes a step of (block 1004) selecting the force trim release 162. Selecting the force trim release 162 temporarily overrides (e.g., deactivates or disengages) the automated trim mode. Accordingly, the method 1000 includes a step of (block 1006) disengaging the automated trim mode upon selection of the force trim release 162.

In one or more examples, selecting of the force trim release 162 and disengaging the automatic trim mode affects a switch in the operational mode of the aeronautic vehicle 100 and the active control inceptor 124 from the automatic trim mode to the rate command mode. The rate command mode refers to a mode of operation (e.g., according to the flight control laws 122) in which a different force-feel and control law strategy is implemented by the flight control computer 120. For example, in the rate command mode, the operator 126 controls (e.g., commands) the rate of the aeronautic vehicle 100 in a manual trimming mode. Accordingly, selecting of the force trim release 162 and disengaging the automatic trim mode enables the operator 126 to execute a maneuver in rate command control and to manually trim the aeronautic vehicle 100 to a desired trim condition.

In one or more examples, upon selecting the force trim release 162, the method 1000 includes a step of (block 1008) designating the first stick position 148-1 of the control member 132 as the reference position 192 (e.g., according to the reference logic 190 illustrated in FIG. 8).

In one or more examples, with the force trim release 162 selected, the method 1000 includes a step of (block 1010) moving the control member 132 from the first stick position 148-1 to the second stick position 148-2. Movement of the control member 132 from the first stick position 148-1 to the second stick position 148-2 is performed by application of the input force 128 by the operator 126. Moving of the control member 132 from the first stick position 148-1 to the second stick position 148-2 commands (e.g., affects a change in) the vehicle-body rate of the aeronautic vehicle 100.

In one or more examples, with the force trim release 162 selected and with the control member 132 at the second stick position 148-2, the method 1000 includes a step of (block 1012) designating the second stick position 148-2 as the detent position 150 (e.g., according to the detent logic 186 illustrated in FIG. 9). In other words, the detent position 150 follows the position of the control member 132 (the stick position 148) wherever the operator 126 moves it to (e.g., from the first stick position 148-1 to the second stick position 148-2). Generally, the step of (block 1012) designating the second stick position 148-2 as the detent position 150 (e.g., the detent position 150 following the stick position 148) provides a "smooth feel" when moving the control member 132.

In one or more examples, with the force trim release 162 selected, the method 1000 includes a step of (block 1014) determining the stick delta 194 between the reference position 192 and the second stick position 148-2 and a step of (block 1016) generating the rate command 216. The rate command 216 is generated from (e.g., is computed using) the stick delta 194. The method 1000 also includes a step of (block 1018) generating the trim command 152. The trim command 152 is generated from (e.g., is computed using) the rate command 216 and the vehicle-body state 200 of the aeronautic vehicle 100.

In one or more examples, with the control member 132 at the second stick position 148-2, the method 1000 includes a step of (block 1020) deselecting the force trim release 162. Deselecting the force trim release 162 reengages (e.g., reactivates) the automated trim mode.

In one or more examples, upon deselecting the force trim release 162, the method 1000 includes a step of (block 1022) designating the second stick position 148-2 as the reference position 192 (e.g., according to the reference logic 190 illustrated in FIG. 8) and a step of (block 1024) designating the trim command 152 as the detent position 150 (e.g., according to the detent logic 186 illustrated in FIG. 9).

In one or more examples, upon deselecting the force trim release 162, the method 1000 includes a step of (block 1026) maintaining the detent position 150 as the second stick position 148-2 until the trim command 152 is within the predetermined threshold 212 of the detent position 150 (e.g., according to the detent logic 186 illustrated in FIG. 9). In these examples, according to the method 1000, the step of (block 1024) designating the trim command 152 as the detent position 150 is performed upon (e.g., when) the trim command 152 is within the predetermined threshold 212 of the detent position 150.

In one or more examples, the method 1000 includes a step of using the rate limited trim command 210 and a step of designating the rate limited trim command 210 as the detent position 150. In these examples, the method 1000, such as the step of (block 1018) generating the trim command 152, includes a step of generating the rate limited trim command 210. The rate limited trim command 210 is based on (e.g., is computed using) the trim command 152. In these examples, upon deselecting the force trim release 162, the method 1000, such as the step of (block 1024) designating the trim command 152 as the detent position 150, includes a step of designating the rate limited trim command 210 as the detent position 150.

In one or more examples, upon deselecting the force trim release 162, the method 1000, such as the step of (block 1026) maintaining the detent position 150 as the second stick position 148-2 until the trim command 152 is within the predetermined threshold 212 of the detent position 150, includes a step of maintaining the detent position 150 as the second stick position 148-2 until the rate limited trim command 210 is within the predetermined threshold 212 of the detent position 150. In these examples, according to the method 1000, the step of designating the rate limited trim command 210 as the detent position 150 is performed upon (e.g., when) the rate limited trim command 210 is within the predetermined threshold 212 of the detent position 150.

Accordingly, deselection of the force trim release 162 (e.g., block 1020) affects a reversion (e.g., is indicative of the operator's intent to revert) to the automatic trim mode. Thus, the method 1000 includes a step of (block 1028) reengaging the automated trim mode upon deselection of the force trim release 162. Flight control and operation of the aeronautic vehicle 100 then continues in the automated trim mode until the operator 126 executes another temporarily override of the automated trim mode by selecting the force trim release 162 (e.g., block 1004).

Figure 11:
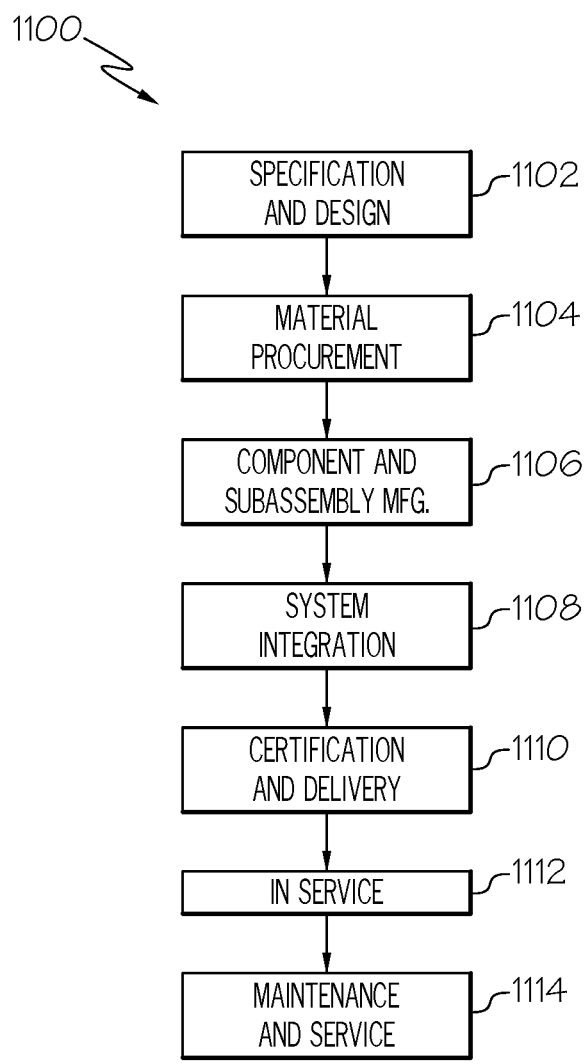
FIG. 11 is a flow diagram of an aeronautic vehicle manufacturing and service methodology.

Referring now to FIGS. 5 and 11, examples of the flight control system 116 and the method 1000 may be related to, or used in the context of, an aeronautic vehicle manufacturing and service method 1100, as shown in the flow diagram of FIG. 11 and the aeronautic vehicle 100, as schematically illustrated in FIG. 5. For example, the aeronautic vehicle 100 may utilize the flight control system 116 and/or the method 1000 to control flight and the flight control system 116 may be integrated within the aeronautic vehicle 100 according to the aeronautic vehicle production and service methodology 1100.

Referring to FIG. 11, during pre-production, the method 1100 includes specification and design of the aeronautic vehicle 100 (block 1102) and material procurement (block 1104). During production of the aeronautic vehicle 100, component and subassembly manufacturing (block 1106) and system integration (block 1108) of the aeronautic vehicle 100 take place. Thereafter, the aeronautic vehicle 100 goes through certification and delivery (block 1110) to be placed in service (block 1112). Routine maintenance and service (block 1114) includes modification, reconfiguration, refurbishment, etc. of one or more systems of the aeronautic vehicle 100.

Each of the processes of the method 1100 illustrated in FIG. 11 may be performed or carried out by a system integrator, a third party, and/or an operator (e.g., a customer). For the purposes of this description, a system integrator may include, without limitation, any number of aeronautic vehicle manufacturers and major-system subcontractors; a third party may include, without limitation, any number of vendors, subcontractors, and suppliers; and an operator may be an airline, leasing company, military entity, service organization, and so on.

Examples of the flight control system 116 shown and described herein may be employed during any one or more of the stages of the manufacturing and service method 1100 shown in the flow diagram illustrated by FIG. 11. In an example, implementations of the flight control system 116 may form a portion of component and subassembly manufacturing (block 1106) and/or system integration (block 1108). For example, production of the aeronautic vehicle 100 that includes the flight control system 116 may correspond to component and subassembly manufacturing (block 1106) and/or system integration (block 1108). Further, the flight control system 116 may be utilized in a manner similar to components or subassemblies prepared while the aeronautic vehicle 100 is in service (block 1112). Also, the flight control system 116 may be utilized during certification and delivery (block 1110). Similarly, implementations of the flight control system 116 may be utilized, for example and without limitation, while the aeronautic vehicle 100 is in service (block 1112) and during maintenance and service (block 1114).

Although a rotorcraft example is shown, the examples and principles disclosed herein may be applied to other aeronautic fields and aeronautic vehicles. Accordingly, in addition to rotorcraft, the examples and principles disclosed herein may apply to human behavior simulators (e.g., flight simulators), commercial aircraft, military aircraft, manned spacecraft, and any other aeronautic vehicle that employs back-driven flight controls to provide an operator the ability to bypass the intentions of an automatic system.

Additionally, the examples and principles disclosed herein may also apply to other types of vehicles that utilize some level of automated vehicle control, such as marine vehicles, submersible vehicles, and the like.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-9, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-9, referred to above, need be included in every example and not all elements, features, and/or components described herein are necessarily depicted in each illustrative example. Accordingly, some of the elements, features, and/or components described and illustrated in FIGS. 1-9 may be combined in various ways without the need to include other features described and illustrated in FIGS. 1-9, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-9, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-9, and such elements, features, and/or components may not be discussed in detail herein with reference to each of FIGS. 1-9. Similarly, all elements, features, and/or components may not be labeled in each of FIGS. 1-9, but reference numerals associated therewith may be utilized herein for consistency.

In FIGS. 10 and 11, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 10 and 11 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the aeronautic vehicle 100, the flight control system 116, and the method 1000 have been shown and described, modifications may occur to those skilled in the art upon reading the specification. The present application includes such modifications and is limited only by the scope of the claims.

What is claimed is:

1. A flight control system of an aeronautic vehicle, the flight control system comprising:
    an active control inceptor configured to selectively control a flight control surface of the aeronautic vehicle and comprising a control member, configured to be moved from a first stick position to a second stick position to command a vehicle-body rate of the aeronautic vehicle and comprising a detent position that holds an attitude of the aeronautic vehicle when an input force, applied to the control member by an operator, is zero;
    a flight control computer coupled to the active control inceptor and programmed to generate a trim command from the second stick position, a reference position, and a vehicle-body state of the aeronautic vehicle; and
    a force trim release coupled to the active control inceptor and to the flight control computer, wherein the force trim release is configured to be selected or deselected, wherein:
        with the force trim release selected when the control member is moved from the first stick position to the second stick position by application of the input force by the operator, the flight control computer designates the reference position to be equal to the first stick position and the active control inceptor designates the detent position to be equal to the second stick position; and
        upon deselection of the force trim release with the control member at the second stick position, the flight control computer designates the reference position to be equal to the second stick position and the active control inceptor designates the detent position to be equal to the trim command.

2. The flight control system of claim 1, wherein:
    with the force trim release selected, the flight control computer is programmed to:
        determine a stick delta between the reference position and the second stick position; and
        generate a rate command from the stick delta; and
    the trim command is generated from the rate command and the vehicle-body state.

3. The flight control system of claim 2, further comprising a state sensor configured to generate a sensor signal representing the vehicle-body state.

4. The flight control system of claim 1, wherein, upon deselection of the force trim release, the active control inceptor designates the detent position to be equal to the second stick position until the trim command is within a predefined threshold of the detent position, whereupon the active control inceptor designates the detent position to be equal to the trim command.

5. The flight control system of claim 1, further comprising a trim rate limiter, configured to generate a rate limited trim command based on the trim command,
    wherein, upon deselection of the force trim release, the active control inceptor designates the detent position to be equal to the rate limited trim command.

6. The flight control system of claim 5, wherein, upon deselection of the force trim release, the active control inceptor designates the detent position to be equal to the second stick position until the rate limited trim command is within a predefined threshold of the detent position, whereupon the active control inceptor designates the detent position to be equal to the rate limited trim command.

7. The flight control system of claim 1, wherein, with the force trim release deselected when the control member is moved from the first stick position to the second stick position, the flight control computer designates the reference position to be equal to the detent position when conditions of merge have been satisfied.

8. The flight control system of claim 1, wherein:
    the active control inceptor further comprises an inceptor actuator coupled to the control member and configured to selectively apply a back-drive force to the control member based on selection or deselection of the force trim release;
    with the force trim release selected, the inceptor actuator is configured to not apply the back-drive force to the control member; and
    with the force trim release deselected and the input force, applied to the control member by the operator, being zero, the inceptor actuator is configured to apply the back-drive force to the control member to automatically move the control member to the detent position.

9. The flight control system of claim 1, wherein the force trim release is configured to be normally deselected.

10. An aeronautic vehicle comprising:
    a flight control surface configured to selectively control an attitude of the aeronautic vehicle;
    an active control inceptor configured to selectively control the flight control surface and comprising a control member, configured to be moved from a first stick position to a second stick position to command a vehicle-body rate of the aeronautic vehicle and comprising a detent position that holds the attitude of the aeronautic vehicle when an input force, applied to the control member by an operator, is zero;
    a flight control computer coupled to the active control inceptor and programmed to generate a trim command from the second stick position, a reference position, and a vehicle-body state of the aeronautic vehicle; and
    a force trim release coupled to the active control inceptor and to the flight control computer, wherein the force trim release is configured to be selected or deselected, wherein:
        with the force trim release selected when the control member is moved from the first stick position to the second stick position by application of the input force by the operator, the flight control computer designates the reference position to be equal to the first stick position and the active control inceptor designates the detent position to be equal to the second stick position; and
        upon deselection of the force trim release with the control member at the second stick position, the flight control computer designates the reference position to be equal to the second stick position and the active control inceptor designates the detent position to be equal to the trim command.

11. The aeronautic vehicle of claim 10, wherein:
    with the force trim release selected, the flight control computer is programmed to:
        determine a stick delta between the reference position and the second stick position; and generate a rate command from the stick delta; and the flight control computer is programmed to generate the trim command based on the rate command and the vehicle-body state.

12. The aeronautic vehicle of claim 11, further comprising a state sensor configured to generate a sensor signal representing the vehicle-body state.

13. The aeronautic vehicle of claim 10, wherein, upon deselection of the force trim release, the active control inceptor designates the detent position to be equal to the second stick position until the trim command is within a predefined threshold of the detent position, whereupon the active control inceptor designates the detent position to be equal to the trim command.

14. The aeronautic vehicle of claim 10, wherein the active control inceptor further comprises a trim rate limiter, configured to generate a rate limited trim command based on the trim command, wherein, upon deselection of the force trim release, the active control inceptor designates the detent position to be equal to the rate limited trim command.

15. The aeronautic vehicle of claim 14, wherein, upon deselection of the force trim release, the active control inceptor designates the detent position to be equal to the second stick position until the rate limited trim command is within a predefined threshold of the detent position, whereupon the active control inceptor designates the detent position to be equal to the rate limited trim command.

16. The aeronautic vehicle of claim 10, wherein, with the force trim release deselected when the control member is moved from the first stick position to the second stick position, the flight control computer designates the reference position to be equal to the detent position when conditions of merge have been satisfied.

17. The aeronautic vehicle of claim 10, wherein:

the active control inceptor further comprises an inceptor actuator coupled to the control member and configured to selectively apply a back-drive force to the control member based on selection or deselection of the force trim release;

with the force trim release selected, the inceptor actuator is configured to not apply the back-drive force to the control member; and with the force trim release deselected and the input force, applied to the control member by the operator, being zero, the inceptor actuator is configured to apply the back-drive force to the control member to automatically move the control member to the detent position.

18. The aeronautic vehicle of claim 10, wherein the force trim release is configured to be normally deselected.

19. A method of controlling flight of an aeronautic vehicle, the method comprising:

operating the aeronautic vehicle in an automated trim mode in which an active control inceptor automatically positions a control member at a detent position to hold an attitude of the aeronautic vehicle when an input force, applied to the control member by an operator, is zero;

with the control member at a first stick position, selecting a force trim release to temporarily override the automated trim mode;

upon selecting the force trim release, designating the first stick position of the control member as a reference position;

with the force trim release selected, moving the control member from the first stick position to a second stick position, by application of the input force by the operator, to command a vehicle-body rate of the aeronautic vehicle;

with the force trim release selected and with the control member at the second stick position, designating the second stick position as the detent position;

with the control member at the second stick position, deselecting the force trim release to reengage the automated trim mode; and upon deselecting the force trim release, designating the second stick position as the reference position and designating a trim command as the detent position.

20. The method of claim 19, further comprising:

with the force trim release selected:
determining a stick delta between the reference position and the second stick position; and
generating a rate command from the stick delta; and generating the trim command from the rate command and a vehicle-body state of the aeronautic vehicle.

* * * * *